(12) United States Patent
Tranchero et al.

(10) Patent No.: US 8,260,734 B2
(45) Date of Patent: Sep. 4, 2012

(54) METHOD AND A SYSTEM FOR ESTIMATING THE IMPACT AREA OF A MILITARY LOAD LAUNCHED FROM AN AIRCRAFT

(75) Inventors: Bruno Tranchero, Costigliole Saluzzo (IT); Alberto Giura, Pino Torinese (IT); Stefania Converso, Avigliana (IT)

(73) Assignee: Alenia Aeronautica S.p.A., Pomigliano d'Arco, Napoli (IT)

( * ) Notice: Subject to any disclaimer, the term of this patent is extended or adjusted under 35 U.S.C. 154(b) by 543 days.

(21) Appl. No.: 12/596,416

(22) PCT Filed: Apr. 9, 2008

(86) PCT No.: PCT/IB2008/051341
§ 371 (c)(1),
(2), (4) Date: Oct. 16, 2009

(87) PCT Pub. No.: WO2008/129435
PCT Pub. Date: Oct. 30, 2008

(65) Prior Publication Data
US 2010/0094789 A1    Apr. 15, 2010

(30) Foreign Application Priority Data
Apr. 18, 2007  (IT) .............................. TO2007A0272

(51) Int. Cl.
*G06N 3/02* (2006.01)
*G06N 3/08* (2006.01)
(52) U.S. Cl. ............................................ 706/21; 706/25
(58) Field of Classification Search .................... 706/21
See application file for complete search history.

(56) References Cited

U.S. PATENT DOCUMENTS 6,254,031 B1 *  7/2001  Mayersak .................... 244/3.22
6,629,085 B1     9/2003  Krogmann

FOREIGN PATENT DOCUMENTS

| EP | 0 482 427 A2 | 10/1991 |
| WO | WO 00/36362 | 6/2000 |

* cited by examiner

*Primary Examiner* — Michael B Holmes
(74) *Attorney, Agent, or Firm* — Merchant & Gould P.C.

(57) ABSTRACT

A system and a method are for the estimation of the impact area of a smart load that can be launched from an aircraft as a function of data or signals indicative of the aircraft flight conditions upon release of the load and of predetermined impact conditions on the target. The estimation of a polygonal impact area defined by the coordinates of a central point and of a predetermined number of vertices is by corresponding neural networks.

15 Claims, 6 Drawing Sheets

METHOD AND A SYSTEM FOR ESTIMATING THE IMPACT AREA OF A MILITARY LOAD LAUNCHED FROM AN AIRCRAFT

This application is a National Stage Application of PCT/IB2008/051341, filed 9 Apr. 2008, which claims benefit of Ser. No. TO2007A000272, filed 18 Apr. 2007 in Italy and which applications are incorporated herein by reference. To the extent appropriate, a claim of priority is made to each of the above disclosed applications.

The present invention relates to the integration of a military load with an aircraft and, more specifically, to the estimation of the time of flight and of the area of impact on the earth's surface of a smart load launched from an aircraft.

The area of impact of a smart load on the ground is the area in which a target must be situated in order to be struck successfully by the load. The size and shape of the area depend on the flight conditions of the aircraft at release of the load, upon atmospheric conditions (for example, temperature, humidity and wind) and upon predetermined conditions of impact on the target (for example, direction of arrival and angle of attack of the load relative to the target, desired impact speed).

Figure 1:
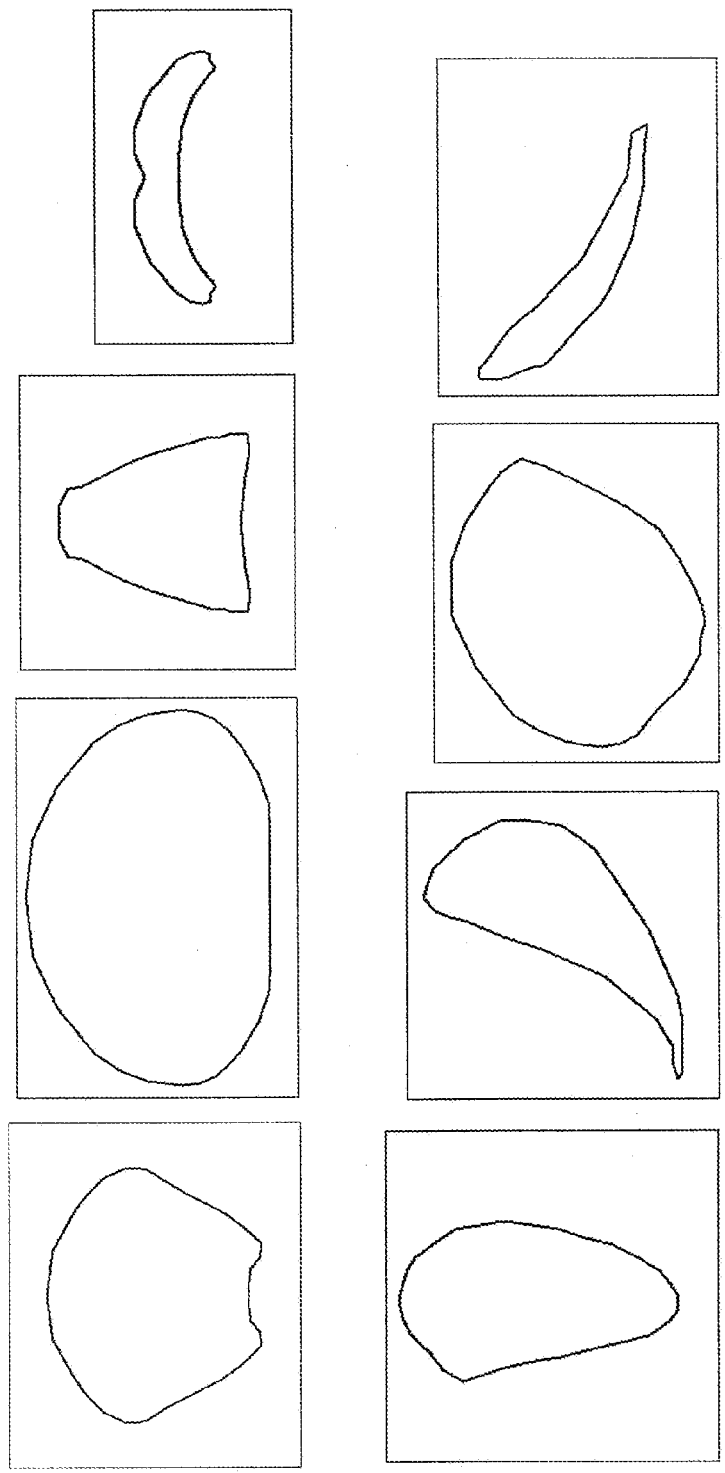

FIG. 1 shows some examples of shapes of possible impact areas according to different release and impact conditions of a load.

When a ballistic load is to be released onto a target there is a single release point for which, theoretically, it can strike the target. In practice, the point of impact of the load on the ground will have a Gaussian distribution around a mean impact point which only rarely coincides with the target. The error may be due to a variation in load characteristics (weight, centre of gravity, moments of inertia) or to limitations of the release algorithm (parameters not modelled), or even to inaccuracies in the estimation of environmental factors (wind, air density, etc.).

Currently, there are several known algorithms for the calculation or estimation of the impact area, which are used by aeronautical companies for the integration of a load with an aircraft.

For a "smart" load, the situation is more complex since that load has the capability to navigate in order to reach a predefined target with a certain degree of accuracy. If the release position, the aircraft flight parameters (for example, speed, accelerations, attitude), the conditions of impact on the target and the atmospheric conditions are known, it is thus necessary to determine whether the load has the capability to "guide itself" onto the predefined target.

The area of impact on the ground in which the predefined target must be in order to be reached successfully by the load is therefore a dynamic area which varies as the known conditions change.

During the planning on the ground of a mission which requires the release of a load, the impact area can be calculated with the use of a system for simulating the performance of the load but, for the success of the mission, it is necessary also to have a system for estimating the impact area in flight, which takes account of the fact that the impact area may vary during the mission.

The problem of estimating the impact area of a smart load in real time is complex and highly non-linear, depending on the conditions of release from the aircraft and of the impact of the load on the target.

The most highly-developed tools for planning on the ground use complex models, for example, numerical calculation models with six degrees of freedom, to predict the trajectory of a load from the release point to the target.

A model with six degrees of freedom is adapted to calculate the trajectory of the load on the basis of the rotational and translational parameters of the load, of the environmental parameters, and of a control model of the flight of the load. Moreover, the model is refined with the use of data obtained by load release tests in order to reduce the error of the prediction with respect to the actual event. The accuracy of the model is very good and the possible error is limited to within a few metres.

However, since this model makes intensive use of the resources of the processing system which governs its execution, it cannot be used for real-time applications on board an aircraft, for example, during a mission.

For real-time applications, it is necessary to use parametric models which match the results of the model with six degrees of freedom with the smallest possible tolerance.

A further disadvantage of the prior art is that models with six degrees of freedom calculate polygonal impact areas which are defined by a notably variable number of vertices.

In order to simplify the simulation tool so as to make it available also for real-time applications, it is desirable to reduce the possible shapes of the impact areas to polygonal shapes with a uniform and limited number of vertices.

The object of the invention is to provide a method and a system for estimating the impact area of a smart load, which are adapted to be executed or installed, respectively, on board an aircraft and for performing the estimation calculations in real time.

In summary, the subjects of the invention are a processing method and system for estimating, on board an aircraft, in real time, the impact area of a smart load and the respective time of flight.

The method is implemented by means of a computer program or set of programs or calculation routines constituting a software application which can be executed by a plurality of processing modules of a complex processing system, adapted to provide a pilot and/or a navigator of an aircraft engaged in a mission with a graphical representation of the estimated impact area of a load on the ground in real time.

Among the possible techniques that can be used for the development of a methodology for the real-time estimation of impact areas, which include mathematical approaches based on linear regressions, non-linear regressions, and neural networks, the present application makes intensive use of the neural network technique so that it can advantageously be implemented on a non-experimental flying platform. Of the various known neural network architectures (GRNN, recursive, and BPN architectures), the neural network architecture which is considered to best approximate the performance of a model with six degrees of freedom for the estimation of the time of flight and of impact areas of a load is a BPN architecture.

The task of calculating the time of flight and the impact areas is advantageously divided into a group of tasks for calculating time of flight and coordinates relating to a predetermined number of boundary points (vertices) of the impact area, respectively.

Tests have been carried out with various types of impact-area modelling that can reduce the number of vertices of the area to 8, 10 or 12 vertices, which can be obtained from the intersections of a corresponding number of straight lines extending through the centroid point of the impact area with the edge of the area.

The best compromise between accuracy of the model and computational requirements was found to be modelling with 8 points at fixed angles.

Figure 2:
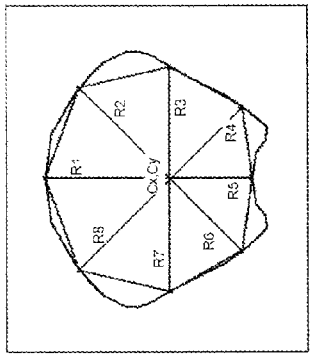
Figure 3:
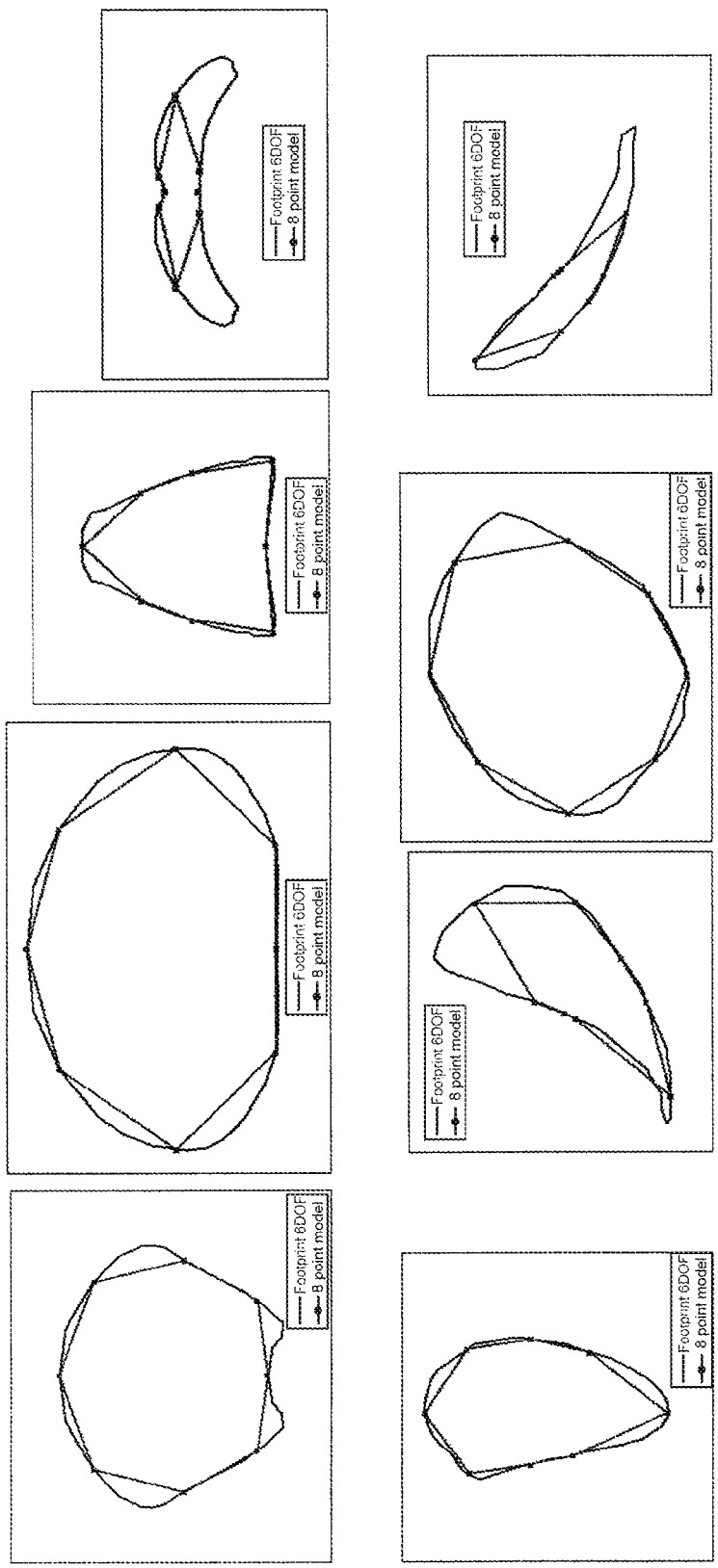

FIG. 2 gives an example of how an impact area with 8 points can be represented in accordance with the coordinates (Cx, Cy) of a centroid point and the modules of radii R1-R8, and FIG. 3 shows the typical shapes of impact areas of FIG. 1 modelled with eight radii at fixed angles.

Like known models with six degrees of freedom, the processing system of the invention is advantageously arranged to distinguish between conditions which allow an impact area and those which do not allow an impact area. The recognition of the conditions which allow an impact area considerably improves the performance of the system, helping to achieve an appreciable reduction in calculation times and in the employment of computational resources, as well as in the risk of estimating false impact areas, and therefore contributes to an increase in the conditions of use of the load.

The function of recognizing the load release and impact envelope zones which allow an impact area is advantageously managed in a different way from that used in known estimation techniques which, since they cannot perform such recognition, have to reduce the ranges of the parameters input to the estimator at the design stage and consequently reduce the possible load release and impact conditions.

Figure 5:
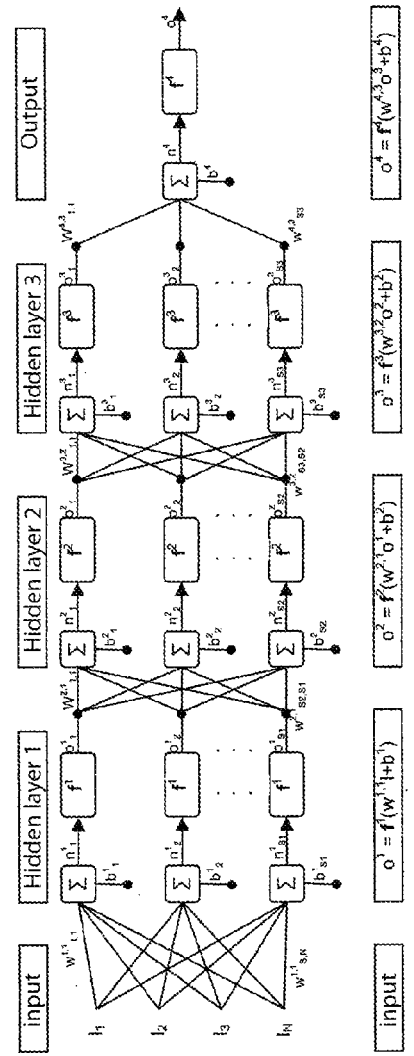
Figure 4:
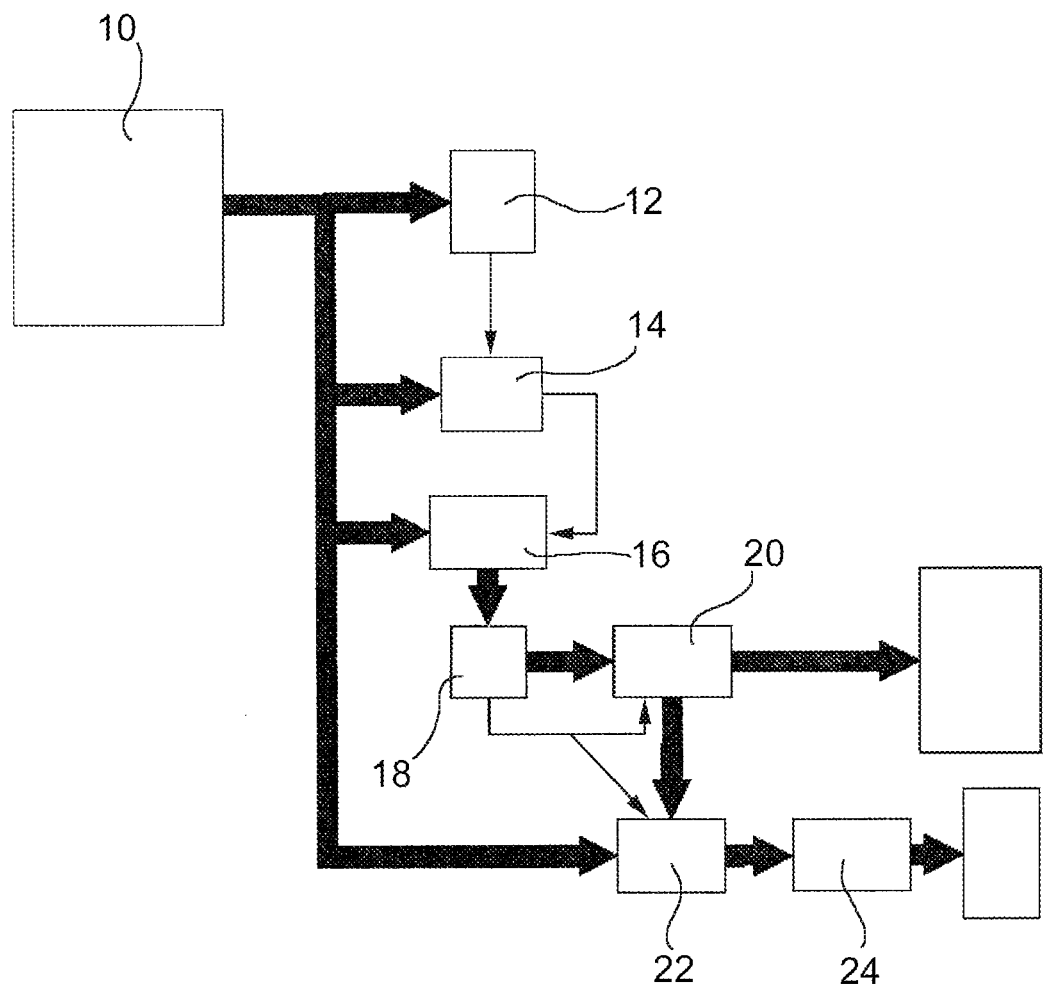
Figure 6:
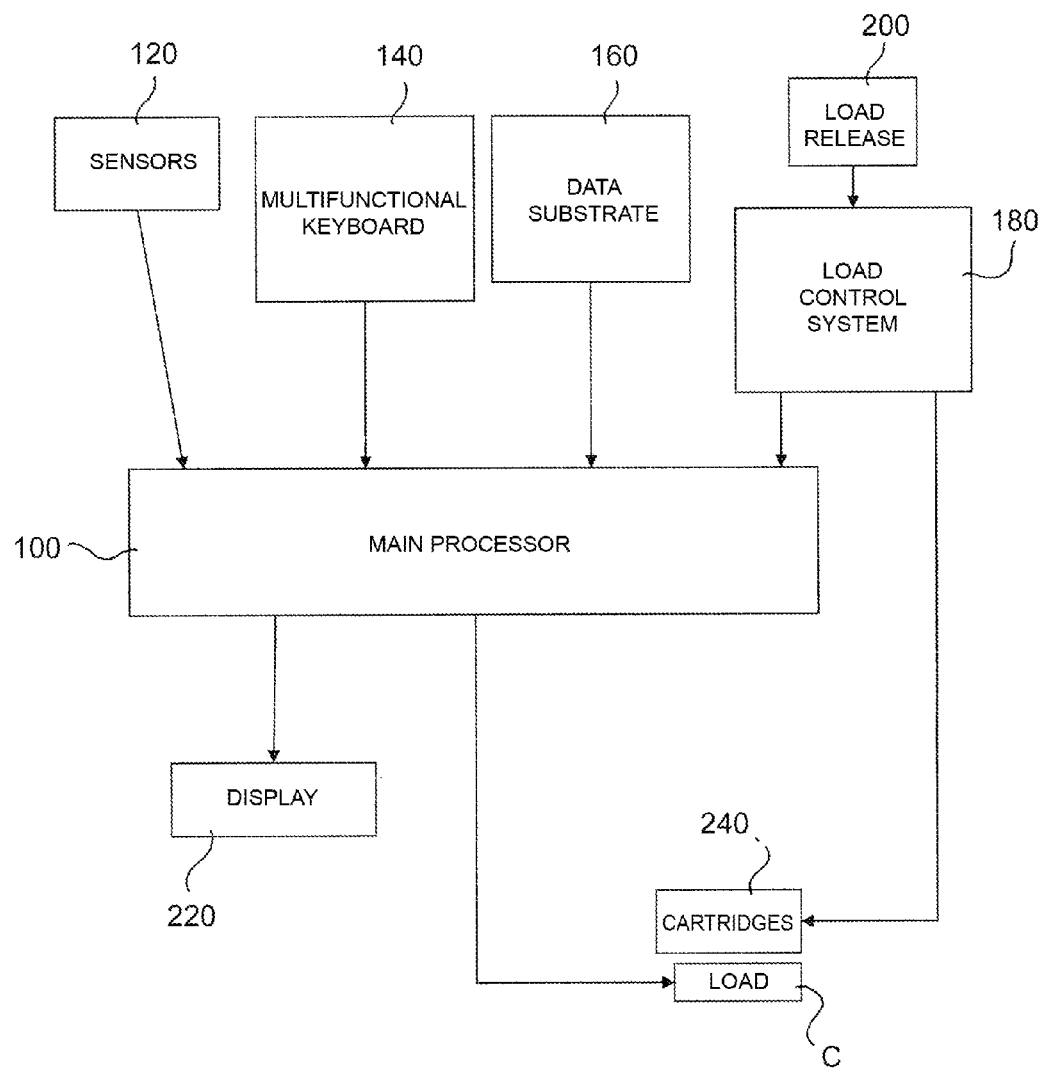
Figure 7:
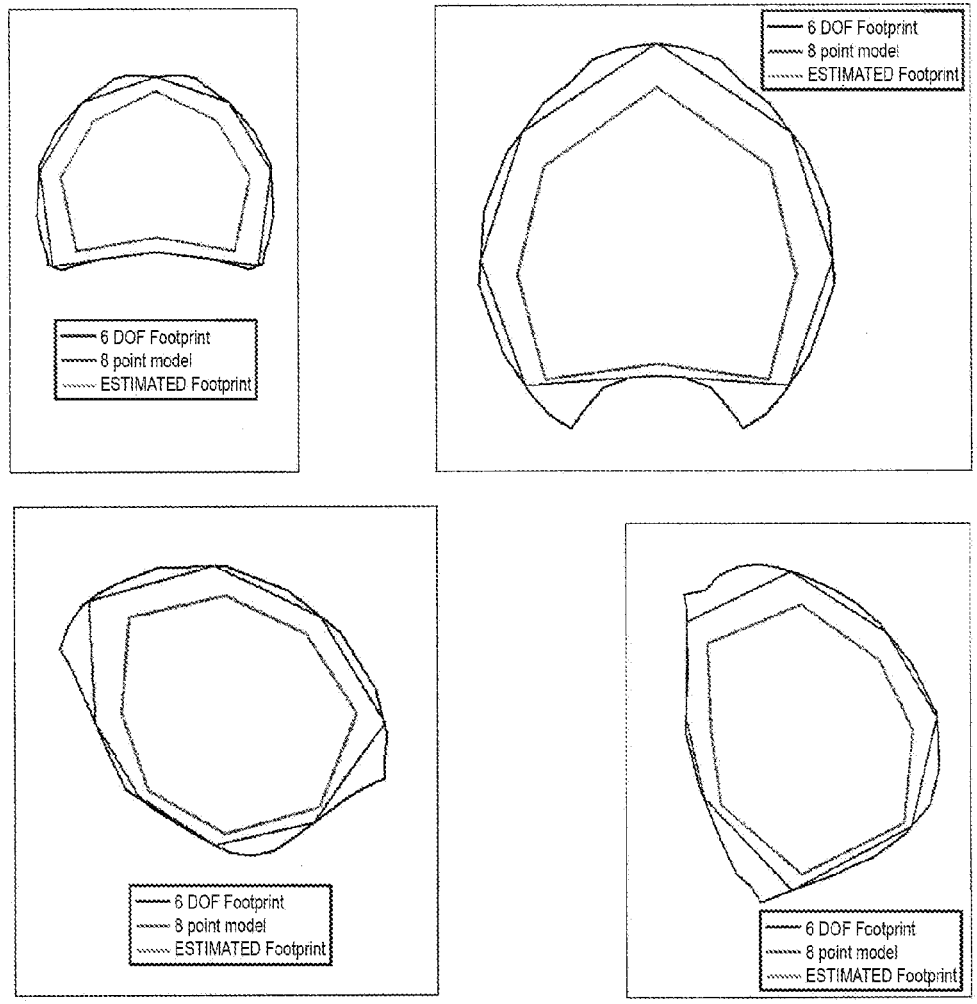

Further characteristics and advantages of the invention will be described in greater detail in the following detailed description of an embodiment thereof which is given by way of non-limiting example with reference to the appended drawings, in which:

FIG. 1 shows a series of different possible shapes of impact areas,

FIG. 2 is an example of the modelling of an impact area having eight radii with fixed angles, FIG. 3 is a collection of possible impact area shapes modelled with eight radii at fixed angles, FIG. 4 is a block diagram representing the processing system of the invention, FIG. 5 is a representation of a backpropagation neural network with five layers on which the processing modules of the system of the invention are based, FIG. 6 is a block diagram of the architecture of the processing system of the system of the invention, and FIG. 7 shows a series of impact-area shapes estimated in accordance with a known model with six degrees of freedom, with a known model with eight points, and with the model based on the neural networks of the invention.

A block diagram of the processing system of the invention is shown in FIG. 4.

In detail, it comprises a first input-parameter management module 10, adapted to receive data or signals indicative of the flight conditions of the aircraft carrying the load (for example, information on the altitude, speed, angle of climb, and direction of travel of the aircraft) and of the conditions of impact on the target (for example, target height, impact angle, impact azimuth).

A plurality of processing modules 12, 14, 16, 18, 20, 22, 24 are associated therewith.

An input-range checking calculation module 12 is arranged for checking the ranges of the input parameters and calculating the values to be supplied as inputs to the subsequent estimation modules.

The module 12 is connected directly to a filter module 14 which is also connected to the module 10 for receiving the input parameters and is arranged to estimate whether or not an impact area exists.

The output of the module 14 is taken to an activation input of the impact-area estimation module 16, adapted to receive, at the input, data or signals indicative of the aircraft flight conditions upon the release of the load and conditions of impact on the target and is arranged to estimate the coordinates of the centroid of the impact area and a predetermined number (for example, eight in the currently-preferred embodiment) of radii of the extent of the impact area, extending from the centroid.

An area filter module 18 receives, at the input, the output of the module 16 and is arranged to calculate the surface area of the estimated impact area, considering it to be non-existent if it is below a predetermined threshold (for example, 1 square kilometre). If a valid impact area is present, the module is arranged to calculate the distances between the vertices of the area and the release point to be used as a datum for subsequent flight-time reduction calculations.

An impact-area reduction module 20, the activation of which is controlled by the filter module 18, is arranged to receive, at its input, the results produced by the module 18 and to reduce the estimated impact area. This module is advantageously adapted to reduce the front radii (with respect to the direction of travel of the aircraft) of the area by a first factor and the rear radii of the area by a second factor (for example of 20% and 10%, respectively) in order to be more conservative and to take account of the effect of the wind and any other flight or release conditions which differ from the nominal conditions. The module is arranged to calculate the coordinates of the vertices of the reduced impact area, which constitute the output of the estimation system of the invention. The module 20 is also arranged to calculate the new distances between the vertices of the reduced impact area and the load release point and is adapted to output this result for the calculation of the reduction of the time of flight.

A time of flight calculation module 22, the activation of which is controlled by the filter module 18, is adapted to receive, at its input, data or signals indicative of the aircraft flight conditions and of the conditions of impact on the target and is arranged to estimate the time of flight of the load to the vertices of the calculated impact area.

A flight-time reduction module 24 is arranged to calculate the time of flight to the vertices of the reduced impact area.

The estimated and reduced time of flight for each vertex of the reduced impact area are output from the module 24.

The set of data of the coordinates of the centroid and of the vertices of the reduced impact area and of time of flight for each vertex of the area constitutes the output of the estimation system of the invention and is managed by a module for presenting the information to the user, for example, for the display, on an on-board screen, of a geometrical representation of the impact area which can advantageously be superimposed on a geographical map of the region overflown.

The impact-area and flight-time estimator described in the present invention is a processing system based on neural networks in which the information necessary to define an impact area and the respective time of flight of the load are calculated by backpropagation neural networks, each of which is adapted to calculate a specific datum.

Neural networks are non-linear systems which can modify their behaviour according to the inputs they receive. A neural network is a set of parallel processors connected to one another in the form of a directed graph which has the ability to learn by means of suitable training.

In particular, in the currently-preferred embodiment, the system is based on supervised neural networks, that is, networks which are trained by examples each of which describes an impact area (output datum) for a predetermined release and ground impact condition of the load (input datum).

The advantage of the neural network technique lies, briefly, in the capability to reduce processing times and costs, to introduce advanced functional capabilities, to reduce the costs of the system, and to increase its operative efficiency.

In order to achieve good performance from a neural network, it is necessary to define the network architecture which is most suitable to represent the problem. This consists in defining the number of layers of the network, the number of neurons per hidden layer, the transfer functions of the layers, and the type of network training.

It is fundamental to create a training file which is adequate for representing the phenomenon under examination. In fact, the set of training data must be complete, particularly when it is extremely non-linear. Moreover, the set of test data for checking the performance of a network must contain inputs other than those on which the network has been trained.

In selecting the network architecture and the set of training data, it must be remembered that, although the performance of the neural network may improve if the above-described factors are varied, it is necessary to avoid an excessive increase in the training times and response times of the network that is being produced. The final selection should therefore be the result of a trade-off of these two aspects, depending on the application of the available hardware and software resources.

According to the invention, it is preferable to use back-propagation neural networks with from 3 to 5 layers and with a single output.

FIG. 5 shows concisely a model of a multi-layered back-propagation network with five layers such as that used in the processing modules of the system of the invention.

In detail, the processing system for the estimation of the impact areas and of the time of flight of a load comprises three sets of BPN-type neural networks:

a first group of neural networks adapted to estimate whether or not the impact area exists according to the aircraft flight conditions upon the release of the load and the conditions of impact of the load on the target; the non-existence of the impact area indicates that, with the specific flight condition upon release of the load, it is not possible to satisfy the required impact conditions;

a second group of neural networks for the calculation of the impact area, comprising a plurality of networks arranged for estimating the coordinates of the centroid of the impact area and the radii of the area, respectively;

a third group of neural networks for calculating the time of flight, comprising a plurality of networks arranged for estimating the time of flight to a respective one of the vertices of the impact area.

In particular, each of these networks comprises transfer functions indicated $f^1, f^2, f^3, f^4$ of the internal layers, which are selected from the group comprising linear, sine, hyperbolic tangent, Gaussian, or complementary Gaussian transfer functions.

Linear transfer functions are used for the normalization of the input and the de-normalization of the output. When the variables are loaded into a neural network they have to be scaled to a numerical range which the neural network can process efficiently. There are two ranges with which networks generally operate, that is, a range between 0 and 1 or a range between −1 and 1. The ranges may be of two types, that is, a "closed" range ([0, 1] or [−1, 1]), for which its values are strictly included within the range or an "open" range, for which its values may be greater than or less than the limits of the range.

An "open" range is advantageously used in the design of the neural networks of the estimator of the invention.

The hyperbolic tangent transfer function is $$\tanh(x) = \frac{e^x - e^{-x}}{e^x + e^{-x}},$$

The Gaussian transfer function is $G(x)=e^{-x^2}$, and the complementary Gaussian transfer function is $GC(x)=1-e^{-x^2}$.

In one embodiment of a neural network, the transfer functions indicated $f^1, f^2, f^3, f^4$, are, in succession, a hyperbolic tangent transfer function, a Gaussian transfer function, a complementary Gaussian transfer function, and a linear transfer function, respectively.

The impact-area and flight-time estimation system is advantageously constructed and incorporated in the main processing system of the aircraft carrying the load.

A system architecture the main unit of which is the central processor of the aircraft is shown in FIG. 6.

A main processor, indicated 100, is arranged to perform the functions of navigation, management of the attack procedures, initialization of loads, and calculation of launch envelopes (that is, the estimation of the impact areas), as well as the functions of management of the presentation of information to the pilot and management of the implementation of the pilot's commands.

Connected to the input of the processor 100 are a plurality of sensors 120 for the acquisition of data indicative of the aircraft flight conditions and load-release conditions, a multi-functional keyboard interface device 140, a solid-state data substrate or memory 160, and a load control system 180.

The interface 140 is arranged, for example, for the input and/or modification of the target coordinates, of the conditions of impact on the target, and of the aircraft course and attack selection data.

The data substrate 160 stores the target coordinates, the conditions of impact on the target, and the aircraft course, which are preset during the preparation of the mission on the ground or are modified in run-time for chance targets.

The load control system 180 is arranged to identify and select the load, to authorize release, and to manage release sequence and timing. A load-release push-button 200 is conventionally associated therewith.

The main processor 100 is also connected to a screen 220 for presenting the mission and attack data to the pilot or to the navigator of the aircraft.

The load control system 180 is adapted to activate the cartridges 240 of a load by means of a respective release command signal and the main processor is adapted to control the load C by supplying it with target coordinate data, alignment data, and an activation signal.

In the description, the processing assembly upon which the system is based has been identified as a microprocessor electronic processing unit provided with at least one storage module for storing respective processing parameters but, in this connection, it is pointed out that, for the purposes of the invention, a plurality of processing units connected in parallel and storage modules should be considered wholly equivalent.

With reference to FIG. 7, this shows some examples of comparisons of the impact area calculated by a conventional simulation model with six degrees of freedom (also shown with a model with eight points) and by the model of the invention.

Advantageously, the real-time estimation system implemented on board the aircraft can calculate an impact area in a time two orders of magnitude less than the time taken by an off-line simulator according to the prior art.

The results obtained in terms of calculation speed and performance of the system and method of the invention advantageously confirm the validity of the approach taken, and the efficacy of the neural networks technique and also of the system architecture designed and described above.

Naturally, the principle of the invention remaining the same, the forms of embodiment and the details of construction may be varied widely with respect to those described and illustrated purely by way of non-limiting example, without thereby departing from the scope of protection of the present invention defined by the appended claims.

The invention claimed is:

1. A system for estimating the impact area of a smart load that can be launched from an aircraft, comprising a processing assembly including:
    means for acquiring first data or signals indicative of the aircraft flight conditions upon release of the load; and
    processing means including a plurality of neural networks, for estimating the target impact point of the load
    wherein said processing assembly further includes means for acquiring second data or signals indicative of predetermined conditions of impact on the target, and
    wherein the processing means are arranged for determining a polygonal impact area as a function of the first and second data or signals, said processing means including a plurality of first neural networks, arranged for calculating the coordinates of a central point of the impact area and of a predetermined number of vertices of the area, respectively.

2. A system according to claim 1, wherein the first neural networks are arranged for the calculation of the radii which extend from the central point of the impact area, which are adapted to define the predetermined number of vertices.

3. A system according to claim 1, wherein the processing means include a plurality of second neural networks which are arranged for the calculation of the time of flight to the vertices of the impact area.

4. A system according to claim 1, wherein the processing means for determining an impact area include a plurality of third neural networks which are arranged to estimate the existence of the impact area as a function of the first and second data or signals indicative of the aircraft flight conditions upon release of the load and of the predetermined conditions of impact on the target.

5. A system according to claim 4, wherein the first, second and third neural networks are backpropagation neural networks with from 3 to 5 layers and comprise transfer functions between the layers which are selected from the group comprising linear, sine, hyperbolic tangent, Gaussian, and complementary Gaussian transfer functions.

6. A system according to claim 5, wherein the first, second and third neural networks comprise 5-layer backpropagation neural networks with 3 hidden layers, having a hyperbolic tangent transfer function of the first hidden layer, a Gaussian transfer function of the second hidden layer, a complementary Gaussian transfer function of the third hidden layer, and a linear output transfer function, respectively.

7. A system according to claim 1, wherein the processing means are arranged for reducing the value of the radii of the impact area particularly for applying a first factor for the reduction of the front radii of the impact area, with respect to the direction of travel of the aircraft, and for applying a second factor for the reduction of the rear radii of the impact area, for calculating the coordinates of the predetermined number of vertices of a reduced impact area, and for calculating the time of flights of the load to the vertices of the reduced impact area.

8. A method of estimating the impact area of a smart load that can be launched from an aircraft, the method being adapted to be implemented by an electronic processing assembly comprising means for determining a polygonal impact area defined by the coordinates of a central point and of a predetermined number of vertices, as a function of first and second data or signals indicative of the aircraft flight conditions upon release of the load and of predetermined conditions of impact of the target, respectively,
    the means including a plurality of first neural networks arranged for calculating the coordinates of the central point of the impact area and of the predetermined number of vertices of the area, respectively,
    the method comprising:
    a learning stage in which the processing assembly receives first and second input training data or signals indicative of the aircraft flight conditions upon release of the load and of the predetermined conditions of impact on the target respectively, as well as associated output training data indicative of the coordinates of a central point and of a predetermined number of vertices of an impact area, and determines the transfer functions between the layers of the first neural networks as a function of the input and output training data, and
    an execution stage in which the processing assembly receives, as inputs, first and second measurement data or signals and calculates an impact-area estimate as a result of the application of the transfer functions.

9. A method according to claim 8, wherein the first neural networks are arranged for calculating the radii which extend from the central point of the impact area, which are adapted to define the predetermined number of vertices.

10. A method according to claim 8, wherein the means include a plurality of second neural networks arranged for calculating the time of flight to the vertices of the impact area, respectively,
    the method comprising:
    a learning stage in which the processing assembly receives first input training data or signals indicative of the aircraft flight conditions upon release of the load and second input training data or signals indicative of the predetermined conditions of impact on the target, as well as associated output training data indicative of the time of flight to the vertices of the impact area, and determines the transfer functions between the layers of the second neural networks as a function of the input and output training data, and
    an execution stage in which the processing assembly receives, as inputs, first and second measurement data or signals and calculates an estimate of time of flight to the vertices of the impact area as a result of the application of the transfer functions.

11. A method according to claim 8, wherein the means include a plurality of third neural networks arranged for estimating the existence of the impact area, respectively,
    the method comprising:
    a learning stage in which the processing assembly receives first input training data or signals indicative of the aircraft flight conditions upon release of the load and second input training data or signals indicative of the predetermined conditions of impact on the target, as well as associated output training data indicative of the existence of an impact area, and determines the transfer functions between the layers of the third neural networks as a function of the input and output training data, and
    an execution stage in which the processing assembly receives, as inputs, first and second measurement data or signals and determines the presence or absence of an impact area as a result of the application of the transfer functions.

12. A method according to claim 8, wherein the first, second and third neural networks are backpropagation neural networks with from 3 to 5 layers and comprise transfer functions between the layers which are selected from the group comprising linear, sine, hyperbolic tangent, Gaussian, and complementary Gaussian transfer functions.

13. A method according to claim 12, wherein the first, second and third neural networks comprise 5-layer backpropagation neural networks with 3 hidden layers having a hyperbolic tangent transfer function of the first hidden layer, a Gaussian transfer function of the second hidden layer, a complementary Gaussian transfer function of the third hidden layer, and a linear output transfer function, respectively.

14. A method according to claim 1, comprising reducing of the value of the radii of the impact area, calculating of the coordinates of the predetermined number of vertices of a reduced impact area, and calculating of the time of flights of the load to the vertices of the reduced impact area, wherein the reduction of the value of the radii of the impact area comprises applying of a first reduction factor to the front radii of the impact area, with respect to the direction of travel of the aircraft, and applying of a second reduction factor to the rear radii of the impact area.

15. A processing program or set of programs adapted to be executed by a processing system and which comprise/s one or more code modules for the implementation of the neural networks of a system for estimating the impact area of a smart load according to claim 1.

* * * * *